(12) United States Patent
Natanzon et al.

(10) Patent No.: US 10,620,845 B1
(45) Date of Patent: Apr. 14, 2020

(54) OUT OF BAND I/O TRANSFERS

(71) Applicant: EMC IP Holding Company, LLC, Hopkinton, MA (US)

(72) Inventors: Assaf Natanzon, Tel-Aviv (IL); Saar Cohen, Mishmeret (IL); Ronald C. Unrau, Edmonton (CA); Brian Lake, Edmonton (CA); Qinghua Ye, Sunnyvale, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 856 days.

(21) Appl. No.: 14/674,816

(22) Filed: Mar. 31, 2015

(51) Int. Cl.
*G06F 3/06* (2006.01)
*G06F 12/0868* (2016.01)
*G06F 9/455* (2018.01)

(52) U.S. Cl.
CPC .......... *G06F 3/0613* (2013.01); *G06F 3/067* (2013.01); *G06F 3/0665* (2013.01); *G06F 3/0689* (2013.01); *G06F 9/45545* (2013.01); *G06F 12/0868* (2013.01); *G06F 2212/604* (2013.01)

(58) Field of Classification Search
CPC ........ G06F 3/0619; G06F 3/065; G06F 3/067; G06F 3/0605; G06F 3/0641; G06F 3/0689; G06F 3/0665; G06F 11/2071; G06F 11/2064; G06F 11/1076; G06F 11/2069; G06F 17/30088; G06F 3/0613; G06F 9/4545; G06F 12/0868; G06F 2212/604
See application file for complete search history.

(56) References Cited

U.S. PATENT DOCUMENTS

| 6,513,097 B1 * | 1/2003 | Beardsley | G06F 11/0724 711/113 |
| 7,200,546 B1 * | 4/2007 | Nourmohamadian | G06F 3/0607 360/49 |
| 7,463,648 B1 * | 12/2008 | Eppstein | G06F 9/5011 370/468 |
| 7,631,155 B1 * | 12/2009 | Bono | G06F 3/0608 707/999.202 |

(Continued)

OTHER PUBLICATIONS

"EMC RecoverPoint Continuous Remote Replication with EMC VPLEX", EMC whitepaper, Jan. 2011.*

(Continued)

*Primary Examiner* — Francisco A Grullon
(74) *Attorney, Agent, or Firm* — Muirhead and Saturnelli, LLC (57) ABSTRACT

Handling I/O operations between a plurality of virtual machines and a plurality of data storage volumes containing data for the virtual machines includes the virtual machines accessing a virtual data storage cluster engine that transfers I/O data between the virtual machines and the data storage volumes and caches at least some of the I/O data, where the virtual data storage cluster appears as a data storage volume to the virtual machines and includes drivers of at least some of the virtual machines routing at least some I/O operations directly to the volumes, where data for I/O operations that is directly routed does not pass through the virtual data storage cluster engine. Drivers for at least one of the virtual machines on a local site may communicate with drivers on a remote site in response to performing an I/O operation with at least one volume on the remote site.

22 Claims, 9 Drawing Sheets

(56) References Cited

U.S. PATENT DOCUMENTS

| | | | |
|---|---|---|---|
| 8,285,758 B1* | 10/2012 | Bono | G06F 17/30079 |
| | | | 707/822 |
| 9,436,591 B1* | 9/2016 | McCloskey | G06F 12/00 |
| 2005/0049849 A1* | 3/2005 | Re | G06F 3/0605 |
| | | | 703/26 |
| 2005/0060704 A1* | 3/2005 | Bulson | G06F 9/5077 |
| | | | 718/1 |
| 2006/0074927 A1* | 4/2006 | Sullivan | G06F 17/30067 |
| 2015/0074677 A1* | 3/2015 | Pream | G06F 9/5083 |
| | | | 718/104 |

OTHER PUBLICATIONS

Dharma, R., & Jiang, L. "Networking for Storage Virtualization and EMC RecoverPoint" EMC Techbooks, 2011.*
Shulz, G. "EMC VPLEX: Virtual Storage Redefined or Respun" StoragelOblog, storageioblog.com /emc-vplex-virtual-storage-redefined-or-respun, May 10, 2010.*
Freund, D. "EMC Invista" Illuminata, Jun. 17, 2005.*
Lowe, S. "A Deeper Look at VPLEX", Scott's Weblog, Jun. 7, 2010.*

\* cited by examiner

OUT OF BAND I/O TRANSFERS

TECHNICAL FIELD

This application is related to the field of data storage and, particularly, to systems for managing data and resources in a virtualized environment.

BACKGROUND OF THE INVENTION

A virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. A virtual center may operate to control virtual machines in data centers and, for example, in connection with cloud computing. The virtual center may further include a virtual data center that provides logical control and management of data storage in a data center, and provides for sub-dividing contents of virtual components into compute resources, network resources and storage resources.

Configuring and deploying VMs is known in the field of computer science. For example, U.S. Pat. No. 7,577,722 to Khandekar, et al., entitled "Provisioning of Computer Systems Using Virtual Machines," which is incorporated herein by reference, discloses techniques for configuring and deploying a VM according to user specifications. VMs may be provisioned with respect to any appropriate resource, including, for example, storage resources, CPU processing resources and/or memory. Operations of VMs may include using virtual machine images. A VM that may be moved between different locations and processing thereafter continued without interruption. Reference is made to U.S. Pat. No. 8,667,490 B1 to van der Goot, entitled "Active/Active Storage and Virtual Machine Mobility Over Asynchronous Distances," which is incorporated herein by reference.

Multiple VMs may be provided in a system that includes storage that is managed by a virtual data storage cluster engine, such as the VPLEX system provided by EMC Corporation of Hopkinton, Mass. The virtual data storage cluster engine provides a front end interface to the VMs that appears to the VMs as a local data storage array while providing a back end interface to volumes that contain data. A volume accessed by the virtual data storage cluster engine on behalf of a VM may be on the same site as the VM or may be on a different site and the physical location of data accessed by a VM may be transparent to the VM. The virtual data storage cluster engine may also provide caching for the storage data that is accessed, where data that is accessed frequently and/or recently is stored in relatively faster memory that may be volatile.

A drawback to using a virtual data storage cluster engine is that it results in additional overhead. However, without centralized management of data access like that provided by a virtual data storage cluster engine, data caching may be difficult in a system where multiple VMs on multiple sites access data both locally and on different sites. Accordingly, it is desirable to provide a distributed system that avoids at least some of the overhead associated with a virtual data storage cluster engine without eliminating or reducing the availability of data caching.

SUMMARY OF THE INVENTION

According to the system described herein, handling I/O operations between a plurality of virtual machines and a plurality of data storage volumes containing data for the virtual machines includes the virtual machines accessing a virtual data storage cluster engine that transfers I/O data between the virtual machines and the data storage volumes and caches at least some of the I/O data, where the virtual data storage cluster appears as a data storage volume to the virtual machines and includes drivers of at least some of the virtual machines routing at least some I/O operations directly to the volumes, where data for I/O operations that is directly routed does not pass through the virtual data storage cluster engine. Drivers for at least one of the virtual machines on a local site may communicate with drivers on a remote site, different from the local site, in response to the at least one of the virtual machines performing an I/O operation with at least one volume on the remote site. The virtual data storage cluster engine may handle managing data in a cache for I/O operations that do not pass through the virtual data storage cluster engine. Following routing a read operation directly from one of the virtual machines to one of the volumes, corresponding drivers of the at least one of the virtual machines may determine if data that was read is to be provided to the cache. The data that was read may be transferred to the virtual data storage cluster engine in response to a determination that the data is to be provided to the cache. Prior to routing a write operation directly from one of the virtual machines to one of the volumes, corresponding drivers of the at least one of the virtual machines may determine if a corresponding data slot already exists in the cache. The virtual data storage cluster engine may transfer data to the cache in response to the data slot being in the cache. The data slot may be locked prior to routing a write operation directly from one of the virtual machines to one of the volumes. Caching may be performed only for data from volumes that are shared by more than one of the virtual machines. Caching may be performed only for data from portions of volumes that are accessed relatively frequently.

According further to the system described herein, a non-transitory computer-readable medium contains software that handles I/O operations between a plurality of virtual machines and a plurality of data storage volumes containing data for the virtual machines. The software includes executable code that causes the virtual machines to access a virtual data storage cluster engine that transfers I/O data between the virtual machines and the data storage volumes and caches at least some of the I/O data, where the virtual data storage cluster appears as a data storage volume to the virtual machines and includes executable code that causes at least some of the virtual machines to route at least some I/O operations directly to the volumes, where data for I/O operations that is directly routed does not pass through the virtual data storage cluster engine. Drivers for at least one of the virtual machines on a local site may communicate with drivers on a remote site, different from the local site, in response to the at least one of the virtual machines performing an I/O operation with at least one volume on the remote site. The virtual data storage cluster engine may handle managing data in a cache for I/O operations that do not pass through the virtual data storage cluster engine. Following routing a read operation directly from one of the virtual machines to one of the volumes, corresponding drivers of the at least one of the virtual machines may determine if data that was read is to be provided to the cache. The data that was read may be transferred to the virtual data storage cluster engine in response to a determination that the data is to be provided to the cache. Prior to routing a write operation directly from one of the virtual machines to one of the volumes, corresponding drivers of the at least one of the virtual machines may determine if a corresponding data slot already exists in the cache. The virtual data storage cluster engine may transfer data to the cache in response to the data slot being in the cache. The data slot may be locked prior to routing a write operation directly from one of the virtual machines to one of the volumes. Caching may be performed only for data from volumes that are shared by more than one of the virtual machines. Caching may be performed only for data from portions of volumes that are accessed relatively frequently.

BRIEF DESCRIPTION OF THE DRAWINGS

Embodiments of the system described herein are explained with reference to the several figures of the drawings, which are briefly described as follows.

DETAILED DESCRIPTION OF VARIOUS EMBODIMENTS

Figure 1:
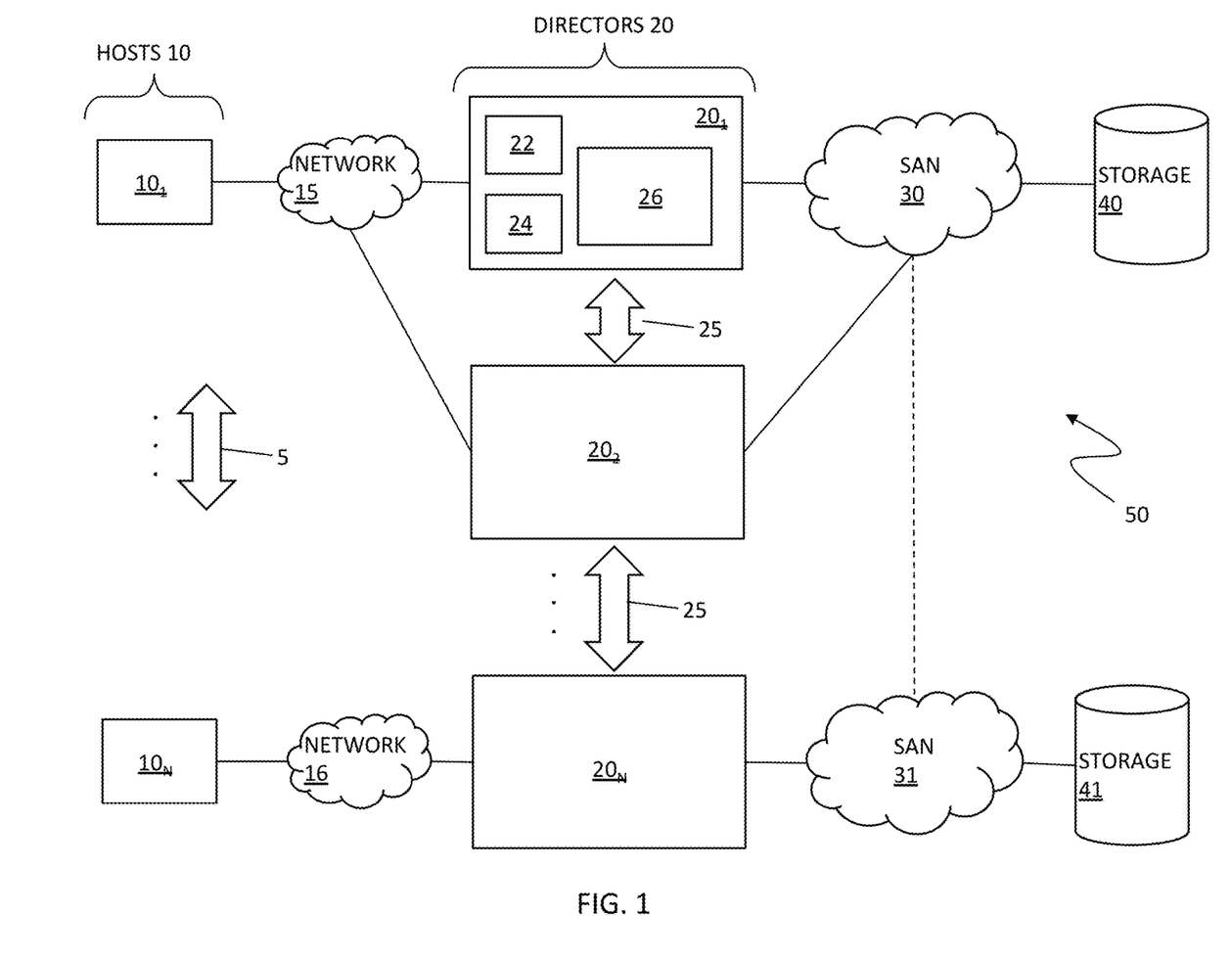
FIG. 1 shows a network configuration of a distributed storage system that may be used in accordance with an embodiment of the system described herein.

FIG. 1 shows a network configuration of a distributed storage system 50 that may be used in accordance with an embodiment of the system described herein. As shown, a plurality of host devices 10 ($10_1$ to $10_N$) are communicably coupled with a plurality of directors 20 ($20_1$, $20_2$ to $20_N$). Each of the directors 20 may include a processor (CPU) component 22, such as a microprocessor or other intelligence module, a cache component 24 (e.g., RAM cache), an instance of a distributed cache manager 26 and/or other local storage and communication ports. In general, "N" is used herein to indicate an indefinite plurality, so that the number "N" when referred to one component does not necessarily equal the number "N" of a different component. For example, the number of hosts 10 may or may not equal the number of directors 20 in FIG. 1. Cache memory may generally be considered memory that is faster and more easily accessible by a processor than other non-cache memory used by a device.

Each of the hosts 10 may be communicably coupled to one or more of directors 20 over one or more network connections 15, 16. It is noted that host devices 10 may be operatively coupled with directors 20 over any of a number of connection schemes as required for the specific application and geographical location relative to each of the directors 20, including, for example, a direct wired or wireless connection, an Internet connection, a local area network (LAN) type connection, a wide area network (WAN) type connection, a VLAN, a proprietary network connection, a Fibre channel (FC) network etc. Furthermore, hosts may also be coupled to one another via the networks 15, 16 and/or operationally via a different network 5 and several of the hosts 10 may be clustered together at one or more sites in which the sites are geographically distant from one another.

Each of the directors 20 may also expose (make available) one or more logical units (volumes) and have one or more file systems deployed on the logical units, such as a virtual machine file system (VMFS), a new technology file system (NTFS) and/or other appropriate file system, and may be communicably coupled with one or multiple storage resources 40, 41, each including one or more disk drives and/or other storage volumes, over one or more storage area networks (SAN) 30, 31, and/or other appropriate network, such as a LAN, WAN, etc. In some embodiments, the networks 15, 16 may be combined, at least in part, with the SAN networks 30, 31 while in other embodiments, the networks 15, 16 may be completely separate from the SAN networks 30, 31. The directors 20 may be located in close physical proximity to each other, and/or one or more may be remotely located, e.g., geographically remote, from other directors, as further discussed elsewhere herein. It is possible for the SANs 30, 31 to be coupled together, and/or for embodiments of the system described herein to operate on the same SAN, as illustrated by a dashed line between the SAN 30 and the SAN 31. Each of the directors 20 may also be able to intercommunicate with other directors over a network 25, such as a public or private network, a peripheral component interconnected (PCI) bus, a Fibre Channel (FC) network, an Ethernet network and/or an InfiniBand network, among other appropriate networks. In other embodiments, the directors may also be able to communicate over the SANs 30, 31 and/or over the networks 15, 16. Several of the directors 20 may be clustered together at one or more sites and in which the sites are geographically distant from one another. The system described herein may be used in connection with a VPLEX product produced by EMC Corporation of Hopkinton, Mass. and/or a vSphere product produced by VMware Inc. of Palo Alto, Calif. The system described herein may also be used in connection with any storage device, including a storage product produced by EMC Corporation, such as a Symmetrix product. Although principally discussed and illustrated in connection with embodiment for a distributed storage system, the system described herein may generally be used in connection with any appropriate distributed processing system.

Each distributed cache manager 26 may be responsible for providing coherence mechanisms for shared data across a distributed set of directors. In general, the distributed cache manager 26 may include a module with software executing on a processor or other intelligence module (e.g., ASIC) in a director. The distributed cache manager 26 may be implemented in a single director or distributed across multiple intercommunicating directors. In certain aspects, each of the directors 20 may be embodied as a controller device, or blade, communicably coupled to one or more of the SANs 30, 31, that allows access to data stored on the storage networks. However, it may be appreciated that a director may also be embodied as an intelligent fabric switch, a hub adapter and/or other appropriate network device and may also be implemented as a virtual machine, as further discussed elsewhere herein. Because Locality Conscious Directory Migration (LCDM) is applicable to databases, any suitable networked director may be configured to operate as an access node with distributed cache manager functionality. For example, a distributed cache manager may be run on one or more desktop computers and/or virtual machines with a network connection.

A distributed storage system may enable a storage device to be exported from multiple distributed directors, which may be either appliances or arrays, for example. In an active/active storage system, if there are multiple interfaces to a storage device, each of the interfaces may provide equal access to the storage device. With an active/active storage system, hosts in different locations may have simultaneous write access to mirrored exported storage device(s) through a local front-end thereof (i.e., a director). The distributed storage system may be responsible for providing globally consistent and coherent data access. The system described herein may be used in connection with enabling the distributed storage system to meet consistency guarantees and maximize data access even in response to failures that may cause inconsistent data within the distributed storage system.

Using virtualization software, one or more physical servers may be subdivided into a plurality of virtual machines. As further discussed elsewhere herein, a virtual machine (VM) is a software implementation of a machine that executes programs like a physical machine. Virtualization software allows multiple VMs with separate operating systems to run in isolation on the same physical server. Each VM may have its own set of virtual hardware (e.g., RAM, CPU, NIC, etc.) upon which an operating system and applications are loaded. The operating system may see a consistent, normalized set of hardware regardless of the actual physical hardware components. The term "virtualization software" is used herein to generally refer to any and all software that supports the operation of one or more VMs. A number of virtualization software products exist, including the VMware product family provided by VMware, Inc. of Palo Alto, Calif. A benefit of providing VMs is the ability to host multiple, unrelated, clients in a single physical server. The virtualization software may maintain separation of each of the clients, and in which each of the clients separately access their own virtual server(s). Other virtualization products that may be used in connection with the system described herein include Hyper-V by Microsoft Corporation of Redmond, Wash., public license virtualization products and/or other appropriate virtualization software.

As discussed in detail elsewhere herein, in a virtualized environment, a virtual center, an example of which may be a vCenter product produced by VMware, Inc. of Palo Alto, Calif., may provide a central point of control for managing, monitoring, provisioning and migrating virtual machines. Virtual centers may operate to control virtual machines in data centers and, for example, in connection with cloud computing. A virtual center may further include a virtual data center that provides logical control and management of data storage in a data center. A virtual center may be used in connection with an infrastructure platform that provides an integrated package of components to provide network, compute and/or storage services for use in a virtualized environment. One example of an infrastructure platform is a Vblock product produced by VCE Company, LLC of Richardson, Tex. It is noted that the term "Vblock" used herein may also be generally understood as including and referring to any appropriate software and/or component packages of a converged infrastructure product that provides network, compute and/or storage services for use in a virtualized computing environment. For example, other suitable types of converged infrastructure products may include EMC Corporation's VMAX SP and/or VSPEX products. Management of a Vblock and/or other appropriate type of converged infrastructure product may be provided by an appropriate software element. For example, EMC's Ionix Unified Infrastructure Manager (UIM) may be integrated with Vblock and provide a management console for management of the Vblock package.

Figure 2:
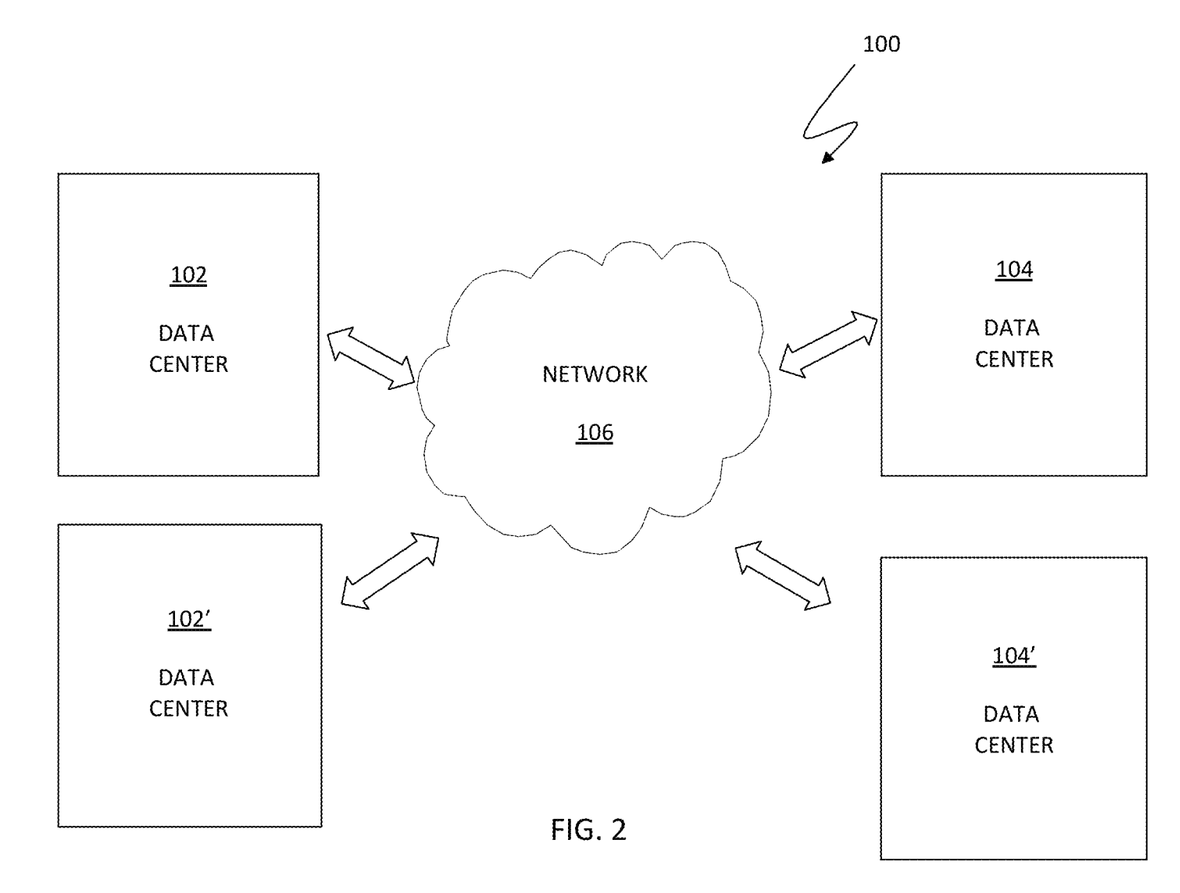
FIG. 2 is a schematic illustration showing a system that includes a plurality of data centers in communication via a network that may be used in accordance with an embodiment of the system described herein.

FIG. 2 is a schematic illustration showing a system 100 that includes a first data center 102 in communication with a second data center 104 via a network 106. Although the following embodiments are discussed principally in connection with the data centers 102, 104 any number of additional data centers, represented as data centers 102', 104', may be also be used in connection with the system described herein. Each of the data centers 102, 104 may include a plurality of storage devices and processors (not shown in FIG. 2) for executing applications using a plurality of VMs and which may be controlled and/or managed in connection with one or more virtual centers and virtual data centers. The VMs may be configured using any appropriate server virtualization technology, such as that provided by VMware, Inc. of Palo Alto, Calif., including vSphere. VSphere is a suite of tools/applications offering the ability to perform cloud computing utilizing enterprise-level virtualization products such as VMware's ESX and/or ESXi. VSphere allows multiple VMs to run on any ESX host. Other VM technology may be used including any appropriate VM technology provided by other vendors.

The data centers 102, 104 may contain any number of processors and storage devices that are configured to provide the functionality described herein. In an embodiment herein, the storage devices may be Symmetrix storage arrays provided by EMC Corporation of Hopkinton, Mass. Other appropriate types of storage devices and different types of processing devices may also be used in connection with the system described herein. The data centers 102, 104 may be configured similarly to each other or may be configured differently. The network 106 may be any network or similar mechanism allowing data communication between the data centers 102, 104. In an embodiment herein, the network 106 may be the Internet and/or any other appropriate network and each of the data centers 102, 104 may be coupled thereto using any appropriate mechanism. In other embodiments, the network 106 may represent a direct connection (e.g., a physical connection) between the data centers 102, 104.

In various embodiments, VMs may be migrated from a source one of the data centers 102, 104 to a destination one of the data centers 102, 104. VMs may be transferred from one data site to another, including VM mobility over geographical distances, for example, for reasons of disaster avoidance, load balancing and testing, among other reasons. A product, such as EMC's VPLEX Metro and/or VPLEX Geo, may be used to enable the resources of disparate storage systems in dispersed data centers to be federated and/or coordinated and utilized as a single pool of virtual storage. VPLEX allows for logical storage units (e.g., logical unit numbers (LUNs)), provisioned from various storage arrays, to be managed through a centralized management interface. Products like VPLEX Metro or Geo provide for data mobility, availability and collaboration through active/active data over synchronous and asynchronous distances with provide for the ability to non-disruptively move many VMs. It is noted that the term "VPLEX" used herein may also generally be understood to refer to and include any appropriate software and/or component packages that provide for coordinating and/or federating resources of disparate systems as a single pool of virtual resources, in particular, for example, a single pool of virtual storage.

Figure 3:
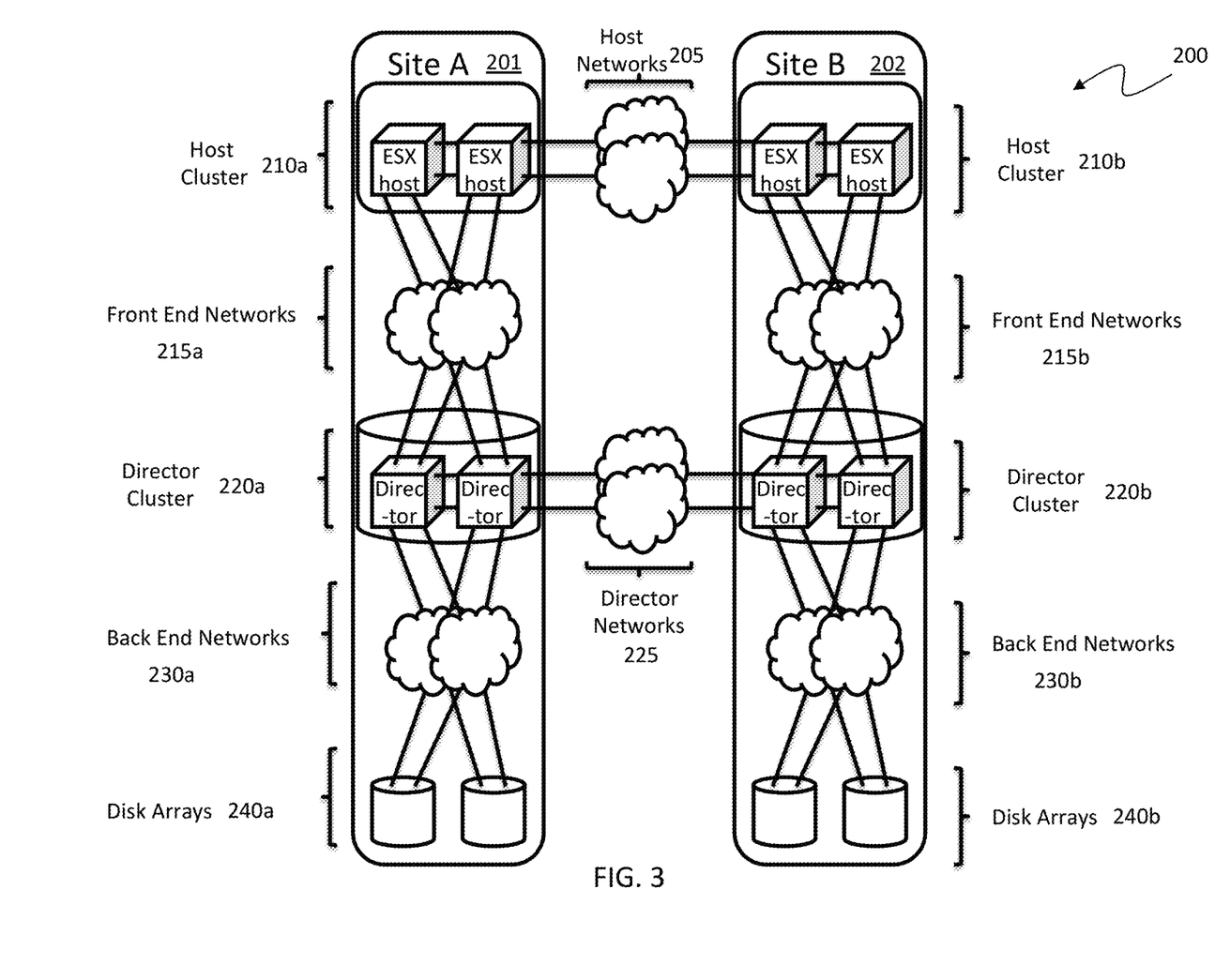
FIG. 3 is a schematic illustration showing a distributed storage system with multiple sites according to an embodiment of the system described herein.

FIG. 3 is a schematic illustration showing a distributed storage system 200 having multiple sites according to an embodiment of the system described herein. Although illustrated with two sites, Site A 201 and Site B 202, the system described herein may also operate in connection with additional sites. Although components are specifically identified with respect to Site A 201, Site B 202 (or any additional site) may also include the components discussed herein. The sites 201, 202 may include one or more hosts possibly grouped in host clusters 210*a*, 210*b*, one or more directors possibly grouped in director clusters 220*a*, 220*b*, and disk array storage device 240*a*, 240*b*. Each host cluster 210*a*, 210*b* and director cluster 220*a*, 220*b* may each include software and/or other controllers or interfaces to control or administer operations in connection with described functions of the hosts and directors. In an embodiment, each host cluster 210*a*, 210*b* may include hosts, such as ESX hosts, in a vSphere cluster and each director cluster 220*a*, 220*b* may include directors in a VPLEX cluster. It is noted that although ESX hosts and illustrated and discussed herein as examples, any appropriate host may be used in connection with the system described herein. Front end networks 215*a*, 215*b* may connect through host links to the host clusters 210*a*, 210*b* and through front end links to the director clusters 220*a*, 220*b*. One or more back end networks 230*a*, 230*b* may connect through back end links to the director clusters 220*a*, 220*b* and through array links to the disk array storage devices 240*a*, 240*b*. In an embodiment, the front and back end networks may be Fibre Channel networks. The front end networks 215*a*, 215*b* allow the hosts (or VMs running therein) to perform input/output (I/O) operations with the host clusters 210*a*, 210*b*, while the back end networks 230*a*, 230*b* allow the directors of the director clusters 220*a*, 220*b* to perform I/O on the disk array storage devices 240*a*, 240*b*. One or more host networks 205, such as vSphere Ethernet networks, may connect the ESX hosts in host clusters 210*a*, 210*b*. One or more director networks 225 may connect the directors of the director clusters 220*a*, 220*b*. In some embodiments, the host networks 205 and the director networks 225 may overlap or possibly even be the same network.

Various types of failures, including network failures within a cluster, may result in behaviors that are further discussed elsewhere herein. It should be noted that the host cluster 210*a*, 210*b* (e.g., vSphere cluster) may be connected in such a way that VMs can maintain their network addresses (e.g., IP, FC, IB, etc. addresses) when migrating between clusters (for example, by means of a vLan or an open vSwitch). In an embodiment, VPLEX may be used and configured to expose one or more distributed volumes from both VPLEX director clusters. A VMFS may be created on top of these distributed volumes allowing VMs that migrate between the sites to see the same file system in either site. It is also noted that, as illustrated and according to various embodiments, each site 201, 202 may include redundancies in hosts, directors and links therebetween.

In some embodiments, the system described herein may be used in connection with a first set of one or more data centers that are relatively active (primary data centers) and a second set of one or more data centers that are relatively inactive (failover data centers). The first set of data centers and second set of data centers may both be used for application reading and writing, but the first set of data centers may be more active and/or include more response time sensitive applications than the second set of data centers. Each of the relatively active data centers in the first set of data centers may use at least one corresponding data center in the second set of data centers for failover operations. It should also be noted that in addition to the active/active system described herein, the system described herein may also be used in active/passive functioning as appropriate or desired.

I/O access may be provided to distributed volumes in an active/active system with two sites separated by an asynchronous latency. For asynchronous operation, a write operation to cluster at a remote site may be acknowledged as soon as a protection copy is made within the cluster. Sometime later the write data is synchronized to the remote site. Similarly, writes to the remote site are later synchronized to a cluster at the local site. Software or other controllers at the director clusters, such as VPLEX, may present the same image of the data on either cluster to provide a cache-coherent view of the data. In an embodiment, this may be achieved by fetching data that has not yet been replicated between a source and destination site (i.e. "dirty" data; as compared with "clean" data which has been copied and is protected on multiple sites) over the inter-cluster link on an as needed basis. In the background, the controller (VPLEX) may synchronize the dirty data between the clusters.

The above operations may work as long as the inter-cluster network is available. If the inter-cluster link fails, both clusters may contain dirty data that is unknown by the respective remote clusters. As a consequence of this failure, the director cluster may roll-back the image of the data to a write order consistent point. In other words, the director cluster may roll-back the image of the data to a point where it knows the data that is available on both clusters, or to a time where the write data was exchanged between both sites. The director cluster may also guarantee roll-back to an image of the disk or volume that is write order consistent, which means that if the data of a specific write is available on the volume, all data of writes that were acknowledged before ("preceded") that write should be present too. Write order consistency is a feature that allows databases to recover by inspecting the volume image. Known techniques may provide write order consistency by grouping writes in what are called deltas and providing the consistency on a delta boundary basis. Reference is made to U.S. Pat. No. 7,475,207 to Bromling et al., entitled "Maintaining Write Order Fidelity on a Multi-Writer System," that discloses a system for maintaining write order fidelity (WOF) for totally active storage system implementations using WOF groups and including application to features such as point-in-time snapshots and continuous data protection, and to U.S. Pat. No. 7,054,883 to Meiri et al., entitled "Virtual Ordered Writes for Multiple Storage Devices," that discloses features for ordering data writes among groups of storage devices. The above-noted references are incorporated herein by reference.

Suspend/resume migration processing may involve suspending a VM in the source site and resuming that VM in the destination site. Before the suspended VM is resumed, all dirty data for the affected VMFS may be synchronized from the source VPLEX cluster to the destination VPLEX cluster, and the preference (i.e. "winner" site) for the distributed volume may be changed from the source cluster to the destination cluster. The preference attribute may be related to a VPLEX consistency group that contains one or more VMs. Hence, the VM may be in a consistency group of its own or all VMs in a consistency group may be migrated together. To know when the synchronization of VPLEX's dirty cache is finished, the customer may map the VMFS to a distributed volume.

Failures may also occur when a VM is migrated while performing I/O operations. In an example, the migration of a VM during I/O operations may be facilitated by a VMware product called vMotion. In a director network failure situation during VM migration, both the source cluster directors and the destination cluster directors may contain dirty data. A similar problem may occur when multiple VMs have to be migrated together because they all access one VMFS volume. In an embodiment, this problem could be alleviated by suspending the restart of the VM on the destination cluster until the director cluster (e.g., VPLEX cluster) cache has been synchronized; however, such operation may cause undesirable delays. For further detailed discussion of specific system behaviors in connection with different types of failure scenarios, reference is made to U.S. Pat. No. 8,667, 490 B1 to van der Goot, entitled "Active/Active Storage and Virtual Machine Mobility Over Asynchronous Distances," which is incorporated herein by reference.

Figure 4:
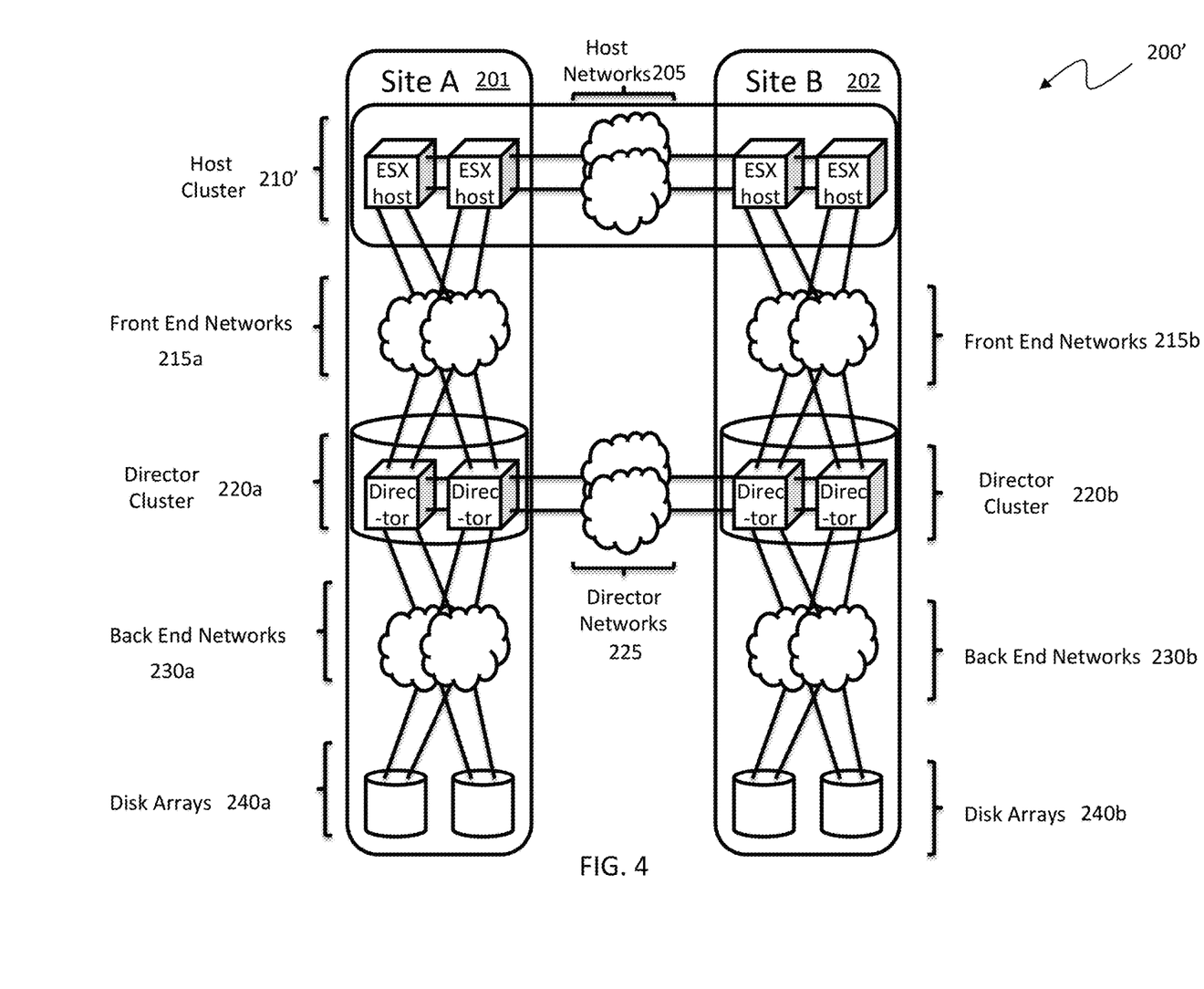
FIGS. 4 and 5 show alternative configurations of distributed storage systems that may be used in accordance with embodiments of the system described herein.
Figure 5:
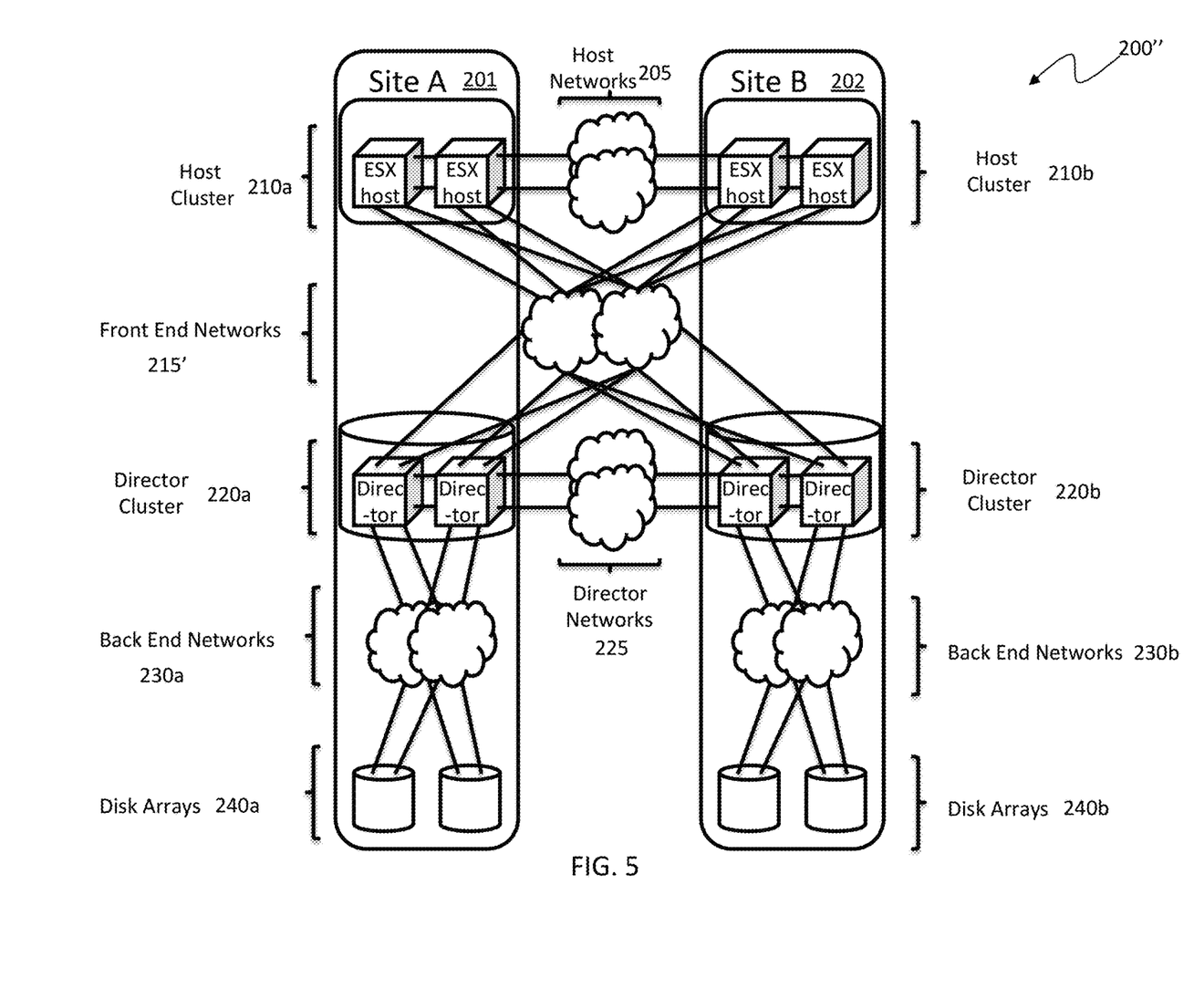

FIGS. 4 and 5 show alternative configurations for distributed storage systems that may be used in accordance with embodiments of the system described herein. In FIG. 4, a distributed storage system 200' is shown that includes a host cluster 210' as a distributed processing layer operating across the multiple sites 201, 202 and otherwise having elements like that discussed elsewhere herein. In FIG. 5, a distributed storage system 200" is shown in which the front end networks 215' are shown operating as an external network accessed by each of the sites 201, 202 and otherwise having elements like that discussed elsewhere herein.

Figure 6:
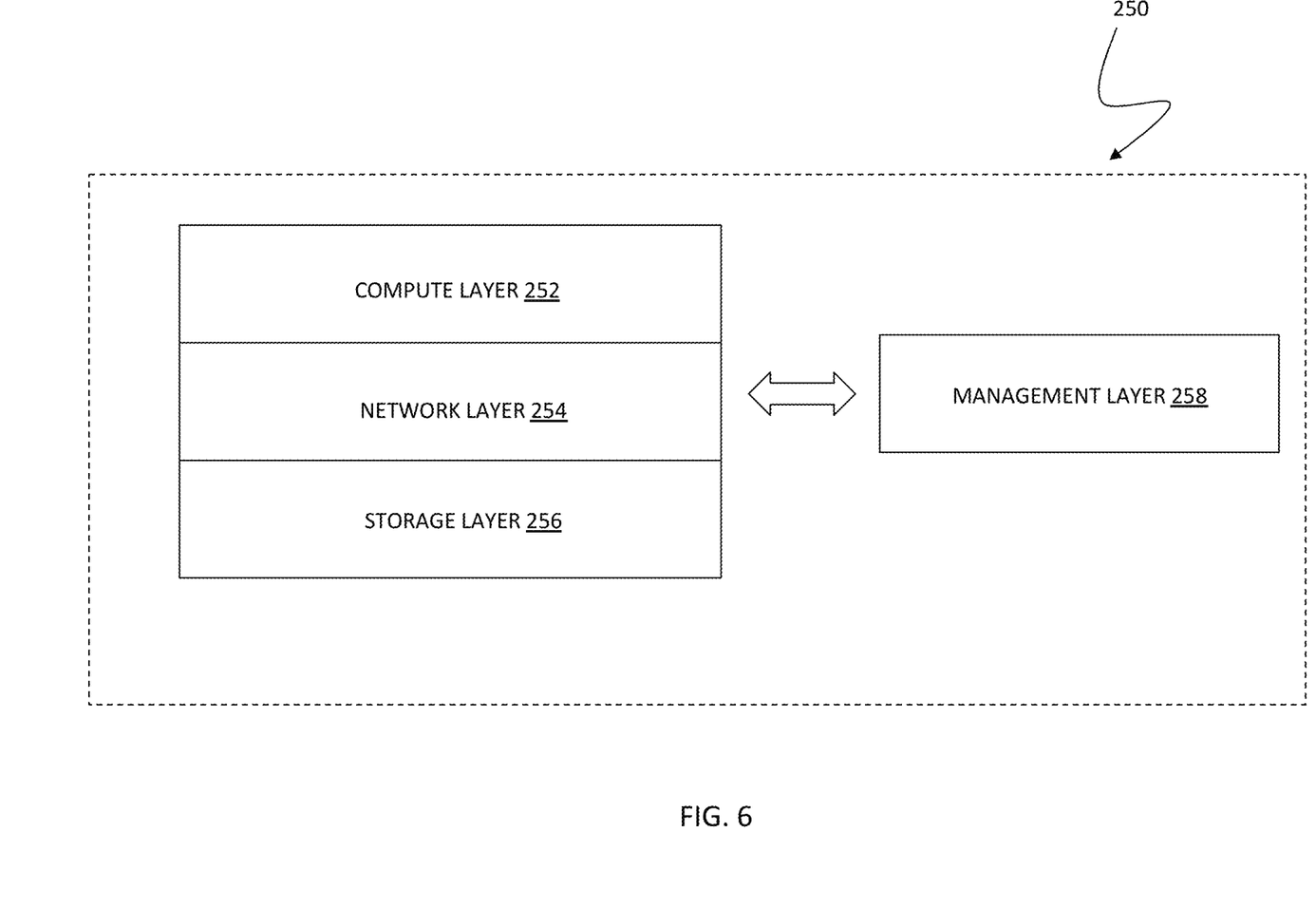
FIG. 6 shows an exemplary cloud computing system that may be used in connection with various embodiments of the system described herein in a manner similar to that discussed herein in connection with other types of distributed processing systems.

FIG. 6 shows an exemplary cloud computing system 250 that may be used in connection with various embodiments of the system described herein in a manner similar to that discussed herein in connection with other types of distributed processing systems. The system 250 may include a compute layer 252, a network layer 254, a storage layer 256 and/or a management layer 258. The system 250 may be understood as providing a cloud computing environment or platform that may be used in connection with cloud storage and/or other appropriate cloud processing applications. The layers 252, 254, 256 and 258 may be coupled together via one or more appropriate networks. In various embodiments, the compute layer 252 may include components, such as blade servers, chassis and fabric interconnects that provide the computing power for the cloud computing system. The storage layer 256 may include the storage components for the cloud computing system, such as one or more storage products produced by EMC Corporation. The network layer 254 may include one or more components that provide switching and routing between the compute 252 and storage 256 layers within systems and/or between multiple cloud computing systems and to the client or customer network. The management layer 258 may provide one or more components used to manage one or more of the layers 252, 254 and/or 256. In an embodiment, the management layer 258 may include EMC Corporation's Unified Infrastructure Manager (UIM).

As discussed elsewhere herein, multiple VMs may be provided in a system that includes storage that is managed by a virtual data storage cluster engine, such as VPLEX, which can manage cache and maintain distributed storage for the VMs. A virtual data storage cluster engine appears as a local data storage array to a VM accessing data even though the corresponding physical storage for the data may be located at a different site. Although a virtual data storage cluster engine may be very useful in a distributed data environment, in some cases the additional overhead introduced by having all I/O operations go through the virtual data storage cluster engine may be unacceptable.

Figure 7:
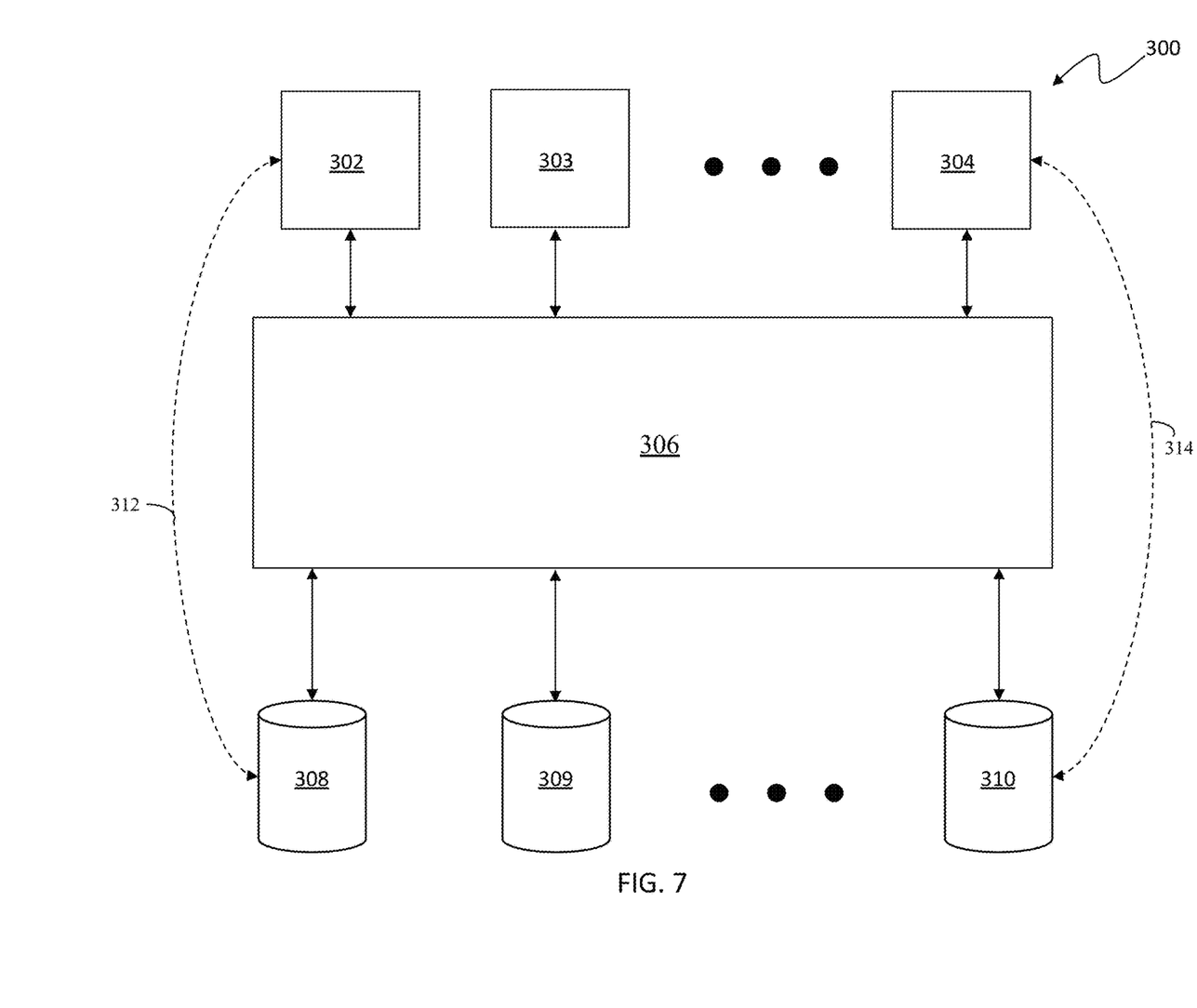
FIG. 7 is a schematic illustration showing a virtual data storage cluster engine with virtual machines and volumes according to an embodiment of the system described herein.

Referring to FIG. 7, a diagram 300 shows a plurality of virtual machines 302-304 coupled to virtual data storage cluster engine 306, such as the VPLEX system provided by EMC Corporation of Hopkinton, Mass. The virtual data storage cluster engine 306 provides the virtual machines 302-304 with access to data stored on a plurality of volumes 308-310 (logical volumes and/or physical volumes) of the system. The volumes 308-310 may be virtual volumes and/or virtual machine disks and/or some other type of data storage volumes. Each of the VMs 302-304 may access the virtual data storage cluster engine 306 to indirectly obtain access to one or more of the volumes 308-310, which may or may not be provided at the same site as a particular one of the VMs 308-310 that is requesting access. In addition, the virtual data storage cluster engine 306 may provide caching functionality so that, for example, data that is accessed more frequently and/or more recently is provided in relatively fast memory (e.g., volatile memory). The cached data may be subsequently destaged back to one of the volumes 308-310 if the data is altered while being stored in the relatively fast memory. As discussed elsewhere herein, the virtual data storage cluster engine 306 may provide cache coherency across multiple sites that contain multiple portions of the cache memory that is used.

The diagram 300 also shows a first alternative data path 312 and a second alternative data path 314. The first alternative data path 312 provides a direct data connection between the VM 302 and the volume 308. Similarly, the second alternative data path 314 provides a direct data connection between the VM 304 and the volume 310. The alternative data paths 312, 314 are used to provide out of band data transfer between one or more of the VMs 302-304 and one or more of the volumes 308-310 that allow data to be transferred between the VMs 302-304 and the volumes 308-310 without having to pass through the virtual data storage cluster engine 306. In an embodiment herein, control information (metadata) may still always be provided through the virtual data storage cluster engine 306, which may still also manage cache coherency for the volumes 308-310. In other embodiments, both data and metadata may be transferred out of band between the VMs 302-304 and the volumes 308-310. Note that, with out of band data connections, data stored in a volume at a first site may be accessed by a VM at a second site without the need to pass through either the virtual data storage cluster engine at the first site or the virtual data storage cluster engine at the second site. Instead, data is transferred directly between the VM at one site and the volume at the other site.

Figure 8:
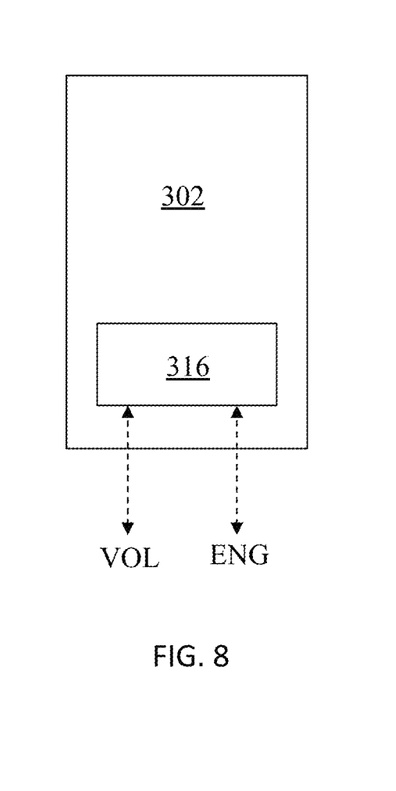
FIG. 8 is a schematic illustration showing a virtual machines with drivers connecting locally to volumes and a virtual data storage cluster engine according to an embodiment of the system described herein.

Referring to FIG. 8, the VM 302 is shown in more detail as including drivers 316 that handle I/O operations for the VM 302. The drivers 316 communicate with both the virtual data storage cluster engine 306 and the volumes 308-310, as described in more detail elsewhere herein. In an embodiment herein, the out of band functionality discussed herein may be provided by drivers used by each of the VMs 302-304. Each of the VMs 302-304 may have a set of drivers that is separate from drivers provided for other ones of the VMs 302-304. In some embodiments, some of the VMs 302-304 may provide out of band functionality while other ones of the VMs 302-304 do not.

Figure 9:
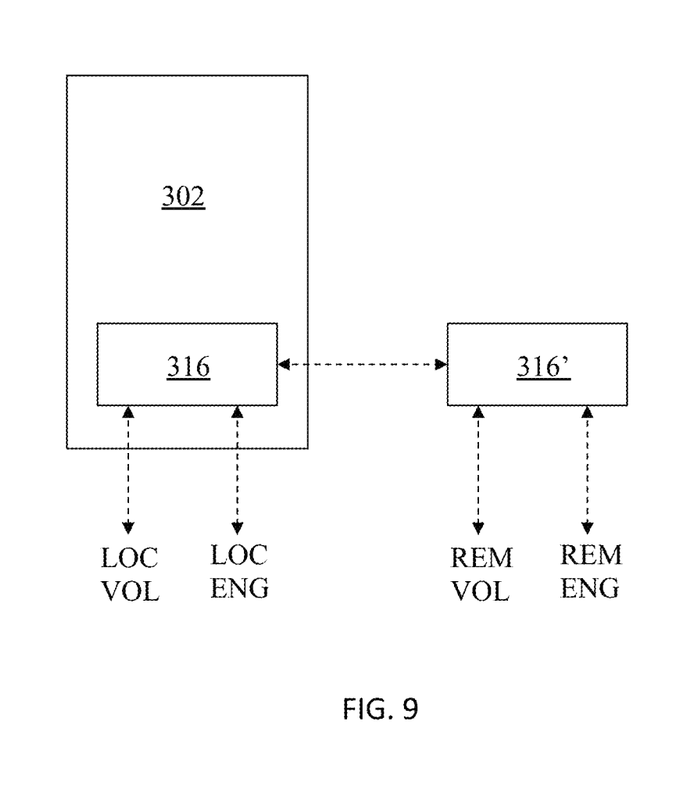
FIG. 9 is a schematic illustration showing a virtual machines with drivers connecting locally and remotely to volumes and a virtual data storage cluster engine according to an embodiment of the system described herein.

Referring to FIG. 9, the VM 302 is shown in more detail in connection with operations at a first, local, site containing the VM 302 and a second, remote, site that is separate from the VM 302. The drivers 316 handle communicate with the virtual data storage cluster engine and the volumes at the local site and handle communication with a second set of drivers 316' at the remote site. The drivers 316' at the remote site communicate with the virtual data storage cluster engine and the volumes at the remote site on behalf of the VM 302.

Figure 10:
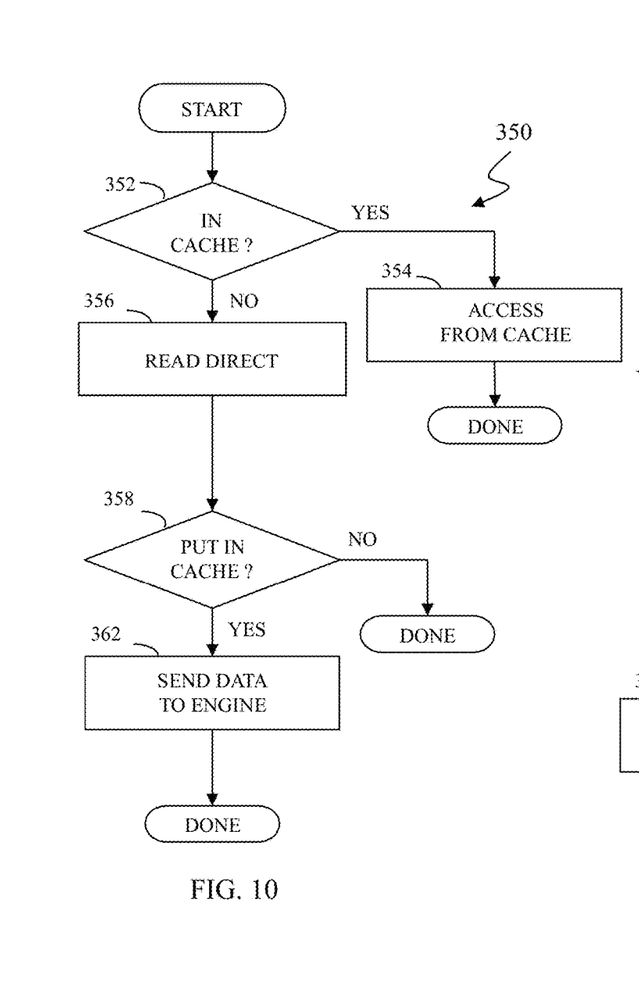
FIG. 10 is a flow diagram illustrating processing performed in connection with a virtual machine reading out of band data according to an embodiment of the system described herein.

Referring to FIG. 10, a flow diagram 350 illustrates drivers of a VM handling a read operation by the VM. Processing begins at a test step 352 where it is determined if the desired data is already in cache. The test at the step 352 may be performed by consulting the virtual data storage cluster engine 306, which manages the cache. If it is determined at the test step 352 that the desired data is in the cache, then control transfers from the test step 352 to a step 354 where the data is read from the cache. Note that reading the data from cache at the step 354 may include first locking the cache slot (to protect from writes by other processes), reading (copying) the data, and then unlocking the cache slot. Following the step 354, processing is complete.

If it is determined at the test step 352 that the desired data is not in cache, then control transfers from the test step 352 to a step 356 where the VM reads the data directly from the volume, bypassing the virtual data storage cluster engine 306. Following the step 356 is a test step 358 where it is determined if the data that was read at the step 356 should be placed in the cache. The test at the step 358 may be performed by consulting the virtual data storage cluster engine 306, which manages the cache. If it is determined at the step 358 that the data should not be placed in the cache, then processing is complete. Otherwise, control transfers from the test step 358 to a step 362 where the data that was just read is transferred to the virtual data storage cluster engine 306, which places the data into the cache. Following the step 362, processing is complete.

Figure 11:
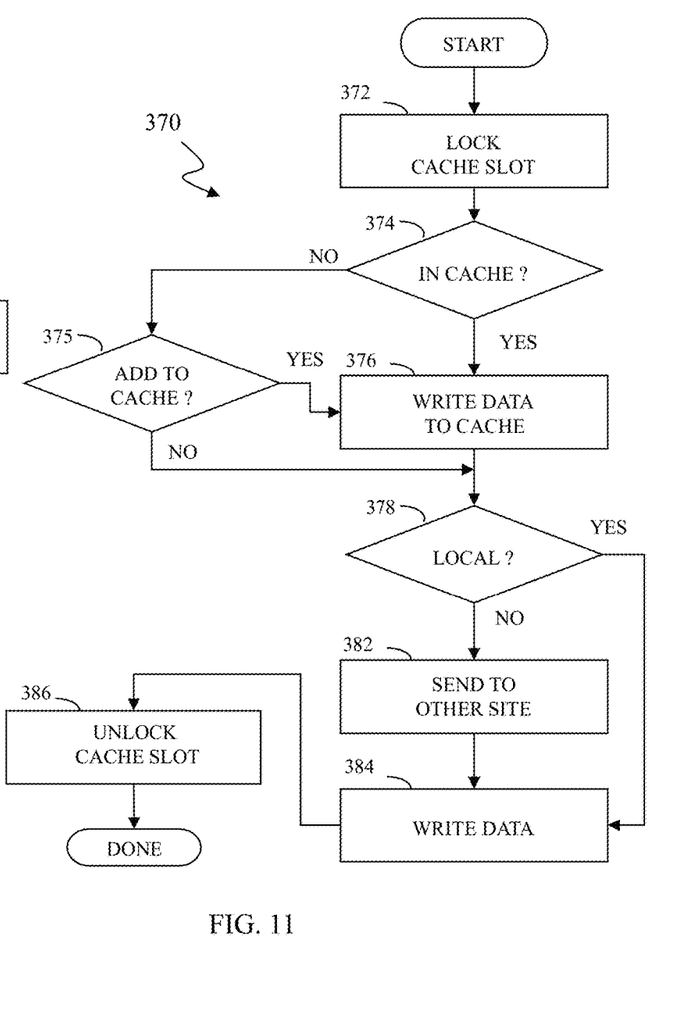
FIG. 11 is a flow diagram illustrating processing performed in connection with a virtual machine writing out of band data according to an embodiment of the system described herein.

Referring to FIG. 11, a flow diagram 370 illustrates drivers of a VM handling a write operation by the VM. Processing begins at a first step 372 where a cache slot is locked. Locking the cache slot at the step 372 prevents other processing from modifying data in the slot (if any) while the write operation is occurring. In some cases, processing at the step 372 may cause the system to lock a blank slot (a slot containing no data). Following the step 372 is a test step 374 where it is determined if the data being written corresponds to a slot that should overwrite older data in the cache (i.e., is already in the cache). If not, then control transfers from the step 374 to a step 375 where it is determined if the data should be added to the cache (according to whatever caching criteria is being used). If so, then control transfers from the step 375 to a step 376 where the new data is written to the cache. Note that writing the data to the cache at the step 376 may include using the virtual data storage cluster engine 306, which manages the cache for the system. Note also that the step 376 can also be reached from the step 374 if the data had already been in the cache.

Following the step 376 is a test step 378 where it is determined if the write operation is local to the site (i.e., the volume containing the data is not mirrored to another site). Note that the step 378 is reached from the step 375 directly if the data is not to be added to the cache. If it is determined at the step 378 that the write operation is not local to the site, then control transfers from the test step 378 to a step 382 where the data is transferred to the remote site. Note that data transferred to the remote site is handled by remote drivers, line the drivers 316' associated with the VM 302 in the example provided elsewhere herein. Following the step 382 is a step 384 where the write operation is performed by local drivers (e.g., the drivers 316 associated with the VM 302 in the example elsewhere herein) and possibly by remote drivers (if the data was transferred to the remote site at the stem 382). Note that the step 384 is reached directly from the step 378 if the write operation is local to the site. Following the step 384 is a step 386 where the cache is unlocked. Following the step 386, processing is complete.

In some embodiments, advanced caching algorithms may be employed to minimize the interaction between the out of band I/O operations and the virtual data storage cluster engine. That is, since the advantages of providing the out of band I/O operations could be somewhat negated by excessive use of the virtual data storage cluster engine for caching, it is useful to provide caching algorithm(s) that avoid excessive use of the engine when out of band I/O operations are performed. One possibility is to divide the storage into extents of a particular size, such as 100 MB, and check the expected cache hit rate for each extent. Note that checking can also be done by the drivers of each VM. The system could then add only extents with high hit rate to the cache (i.e., are accessed relatively frequently). Another possibility is to cache only shared volumes so that if a volume is not shared, only the VM using the volume will access the device from one site only so there is no need to provide coherent caching across sites. Another possible optimization is to lock extents of the cache to specific VMs, for a specific period of time (e.g., a second), and not require the VM to require lock for this period of time. If a different VM desires to access the extent, the different VM will either wait for the lock to release or have the engine request the lock back from the VM that has the lock.

Although the system described herein has been discussed in connection with the use of tracks as a unit of data for certain purposes, it should be understood that the system described herein may be used with any appropriate units or structures of data, such as tracks, and further including, possibly, variable length units of data. It is also noted that one or more storage devices having components as described herein may, alone or in combination with other devices, provide an appropriate platform that executes any of the steps described herein. The system may operate with any snapshot mechanism not inconsistent therewith and/or with any other appropriate point-in-time copy mechanism.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of aspects of the system described herein may include executable code that is stored in a computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of handling I/O operations between a plurality of virtual machines and a plurality of data storage volumes containing data for the virtual machines, comprising:
    the virtual machines accessing a virtual data storage cluster engine that transfers I/O data between the virtual machines and the data storage volumes and caches at least some of the I/O data, wherein the virtual data storage cluster appears as a data storage volume to the virtual machines; and
    drivers of at least some of the virtual machines routing at least some I/O operations directly to the volumes, wherein data for I/O operations that is directly routed does not pass through the virtual data storage cluster engine and wherein at least some control information for the I/O operations routed directly to the volumes passes through the virtual data storage cluster engine.

2. The method, according to claim 1, wherein drivers for at least one of the virtual machines on a local site communicate with drivers on a remote site, different from the local site, in response to the at least one of the virtual machines performing an I/O operation with at least one volume on the remote site.

3. The method, according to claim 1, wherein the virtual data storage cluster engine handles managing data in a cache for I/O operations that do not pass through the virtual data storage cluster engine.

4. The method, according to claim 3, wherein, following routing a read operation directly from one of the virtual machines to one of the volumes, corresponding drivers of the at least one of the virtual machines determines if data that was read is to be provided to the cache.

5. The method, according to claim 4, wherein the data that was read is transferred to the virtual data storage cluster engine in response to a determination that the data is to be provided to the cache.

6. The method, according to claim 3, wherein prior to routing a write operation directly from one of the virtual machines to one of the volumes, corresponding drivers of the at least one of the virtual machines determine if a corresponding data slot already exists in the cache.

7. The method, according to claim 6, wherein the virtual data storage cluster engine transfers data to the cache in response to the data slot being in the cache.

8. The method, according to claim 6, wherein the data slot is locked prior to routing a write operation directly from one of the virtual machines to one of the volumes.

9. The method, according to claim 3, wherein caching is performed only for data from volumes that are shared by more than one of the virtual machines.

10. The method, according to claim 3, wherein caching is performed only for data from portions of volumes that are accessed relatively frequently.

11. A non-transitory computer-readable medium containing software that handles I/O operations between a plurality of virtual machines and a plurality of data storage volumes containing data for the virtual machines, the software comprising:
    executable code that causes the virtual machines to access a virtual data storage cluster engine that transfers I/O data between the virtual machines and the data storage volumes and caches at least some of the I/O data, wherein the virtual data storage cluster appears as a data storage volume to the virtual machines; and
    executable code that causes at least some of the virtual machines to route at least some I/O operations directly to the volumes, wherein data for I/O operations that is directly routed does not pass through the virtual data storage cluster engine and wherein at least some control information for the I/O operations routed directly to the volumes passes through the virtual data storage cluster engine.

12. The non-transitory computer-readable medium, according to claim 11, wherein drivers for at least one of the virtual machines on a local site communicate with drivers on a remote site, different from the local site, in response to the at least one of the virtual machines performing an I/O operation with at least one volume on the remote site.

13. The non-transitory computer-readable medium, according to claim 11, wherein the virtual data storage cluster engine handles managing data in a cache for I/O operations that do not pass through the virtual data storage cluster engine.

14. The non-transitory computer-readable medium, according to claim 13, wherein, following routing a read operation directly from one of the virtual machines to one of the volumes, corresponding drivers of the at least one of the virtual machines determines if data that was read is to be provided to the cache.

15. The non-transitory computer-readable medium, according to claim 14, wherein the data that was read is transferred to the virtual data storage cluster engine in response to a determination that the data is to be provided to the cache.

16. The non-transitory computer-readable medium, according to claim 13, wherein prior to routing a write operation directly from one of the virtual machines to one of the volumes, corresponding drivers of the at least one of the virtual machines determine if a corresponding data slot already exists in the cache.

17. The non-transitory computer-readable medium, according to claim 16, wherein the virtual data storage cluster engine transfers data to the cache in response to the data slot being in the cache.

18. The non-transitory computer-readable medium, according to claim 16, wherein the data slot is locked prior to routing a write operation directly from one of the virtual machines to one of the volumes.

19. The non-transitory computer-readable medium, according to claim 13, wherein caching is performed only for data from volumes that are shared by more than one of the virtual machines.

20. The non-transitory computer-readable medium, according to claim 13, wherein caching is performed only for data from portions of volumes that are accessed relatively frequently.

21. The method, according to claim 1, wherein the control information for the I/O operations routed directly to the volumes manages cache coherency for the volumes.

22. The non-transitory computer-readable medium, according to claim 11, wherein the control information for the I/O operations routed directly to the volumes manages cache coherency for the volumes.

\* \* \* \* \*